US006626393B2

(12) United States Patent
Becherucci et al.

(10) Patent No.: US 6,626,393 B2
(45) Date of Patent: Sep. 30, 2003

(54) ARMATURE WINDER

(75) Inventors: Raffaele Becherucci, Florence (IT); Gianfranco Stratico, Siena (IT)

(73) Assignee: Axis USA, Inc., Tampa, FL (US)

( * ) Notice: Subject to any disclaimer, the term of this patent is extended or adjusted under 35 U.S.C. 154(b) by 0 days.

(21) Appl. No.: 09/981,188

(22) Filed: Oct. 17, 2001

(65) Prior Publication Data

US 2002/0014552 A1 Feb. 7, 2002

Related U.S. Application Data

(63) Continuation of application No. 09/248,931, filed on Feb. 12, 1999.
(60) Provisional application No. 60/075,650, filed on Feb. 23, 1998, and provisional application No. 60/077,158, filed on Mar. 6, 1998.

(51) Int. Cl.[7] .............................................. H02K 15/09
(52) U.S. Cl. ................................... 242/433.3
(58) Field of Search .............................. 242/433.3, 439, 242/441, 441.1, 432.5

(56) References Cited

U.S. PATENT DOCUMENTS

| 3,006,564 A | 10/1961 | Hambleton |
| 3,713,598 A | 1/1973 | Bucholtz et al. |
| 4,289,281 A | 9/1981 | George et al. |
| 4,651,086 A | 3/1987 | Domenichini et al. |
| 5,100,071 A | 3/1992 | Hongo et al. |
| 5,257,745 A | 11/1993 | Lombardi et al. |
| 5,493,770 A | 2/1996 | Anichini et al. ............... 29/597 |
| 5,826,774 A | 10/1998 | Dell'Aglio et al. ........... 226/44 |

FOREIGN PATENT DOCUMENTS

| GB | 810112 | 3/1959 | |
| JP | 63240353 | 10/1988 | ......... H02K/15/095 |
| JP | 01026346 | 1/1989 | ......... H02K/15/095 |
| JP | 02231946 | 9/1990 | .......... H02K/15/09 |
| JP | 06054493 | 2/1994 | ......... H02K/15/095 |
| JP | 07059308 | 3/1995 | ......... H02K/15/095 |
| JP | 09322491 | 12/1997 | ......... H02K/15/085 |

Primary Examiner—Emmanuel Marcelo
(74) Attorney, Agent, or Firm—Fish & Neave; Jeffrey H. Ingerman; Hassan Albakri

(57) ABSTRACT

An armature winder having an adjustable winding arm, includes a wire delivery point with two degrees of freedom—one along the longitudinal axis of the armature winder and one transverse to the longitudinal axis of the armature winder. In one preferred embodiment, the adjustable winding arm pivots around an axis transverse to the longitudinal axis of the winder. This pivoting motion allows adjustment of the wire delivery point along an arcuate path, thereby utilizing each of the degrees of freedom simultaneously.

28 Claims, 4 Drawing Sheets

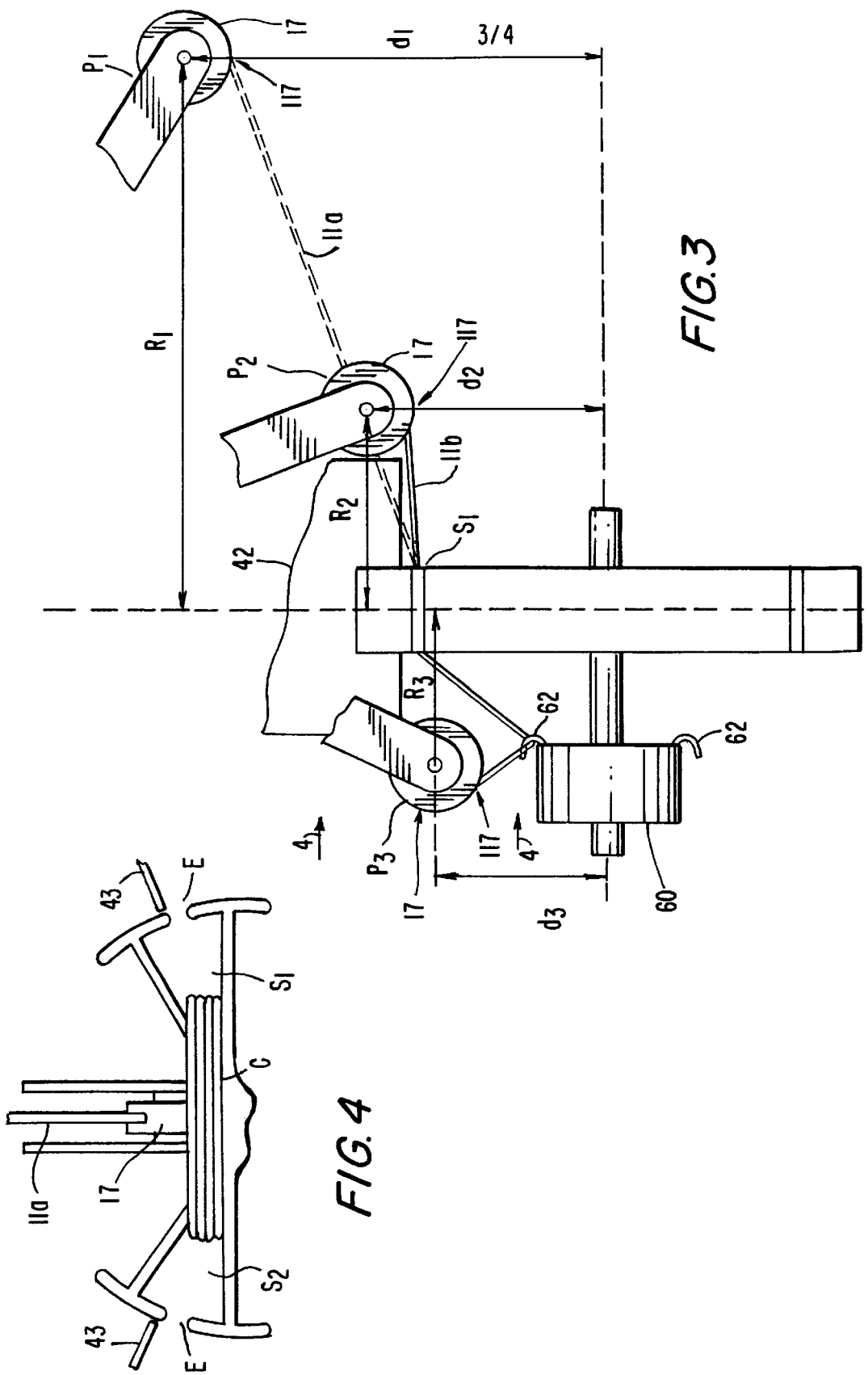

ARMATURE WINDER

This application is a continuation of United States nonprovisional application No. 09/248,931, filed Feb. 12, 1999 which claims the benefit of United States provisional application Nos. 60/075,650, filed Feb. 23, 1998, and 60/077,158, filed Mar. 6, 1998.

BACKGROUND OF THE INVENTION

The present application relates to an invention for winding wire coils in the slots of armatures of dynamoelectric machines (such as fractional horsepower electric motors), by means of a flyer-type winder.

More particularly, the invention is concerned with simplifying the wire guide members (commonly called shrouds or chucks) used in traditional flyer winders.

In such winders, these members are used as guide surfaces to capture and direct wire being delivered by rotation of the flyer into the slots of the armature. More precisely, the wire travels along the surface of the wire guide members to become aligned with and be directed into the slots of the armature.

Wire guide members according to these principles have been described in commonly-assigned U.S. Pat. No. 4,651,086 and U.S. Pat. No. 5,257,745, each of which is hereby incorporated by reference in its entirety.

Conventional winders may be adapted to wind different size armatures. Different armature sizes are accommodated by utilizing extensive wire guide members to properly align the wire as it is wound into the slots of the armature. While conventional winders work well, they add stress to the wire by passing the wire over an extended portion of the wire guide members. Additional stress on the wire may contribute to breakage, and is considered non-optimal. In addition, winding irregularities add to the possibility of breakage. Thus, uniform tension and direction control applied to the wire leaving the flyer would be advantageous.

Therefore, it would be desirable to provide an armature winder which reduces the area of contact between the wire and the winders.

It would also be desirable to simplify the design of the wire guide members.

It would also be desirable to provide an armature winder which exerts uniform tension on the wire being wound.

It would further be desirable to provide an armature winder having improved direction control.

It would still further be desirable to provide an armature winder capable of providing all of the foregoing advantages for armatures having varying sizes and shapes.

SUMMARY OF THE INVENTION

It is an object of this invention to provide an armature winder which reduces the area of contact between the wire and the winders.

It is also an object of this invention to simplify the design of the wire guide members.

It is also an object of this invention to provide an armature winder which exerts uniform tension on the wire being wound.

It is a further object of this invention to provide an armature winder having improved direction control.

It is a still further object of this invention to provide an armature winder capable of providing all of the foregoing advantages for armatures having varying sizes and shapes.

An armature winder having an adjustable winding arm for rotatably winding a wire into an armature is provided. The winding arm delivers wire from a wire delivery point on the winding arm into an armature. The winding arm is adjustable to vary the distance of the wire delivery point radially from a longitudinal axis of the armature winder. This distance can be varied for different armatures.

In one embodiment of the invention, the winding arm pivots about an axis transverse to the longitudinal axis of the armature winder. This pivoting movement allows the wire delivery point to be varied towards or away from the armature along an arcuate path.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 3 is a side view of an adjustable winder arm according to the invention;

FIG. 4 is a side view of an armature and a winder arm according to the invention.

DETAILED DESCRIPTION OF THE INVENTION

Figure 1:
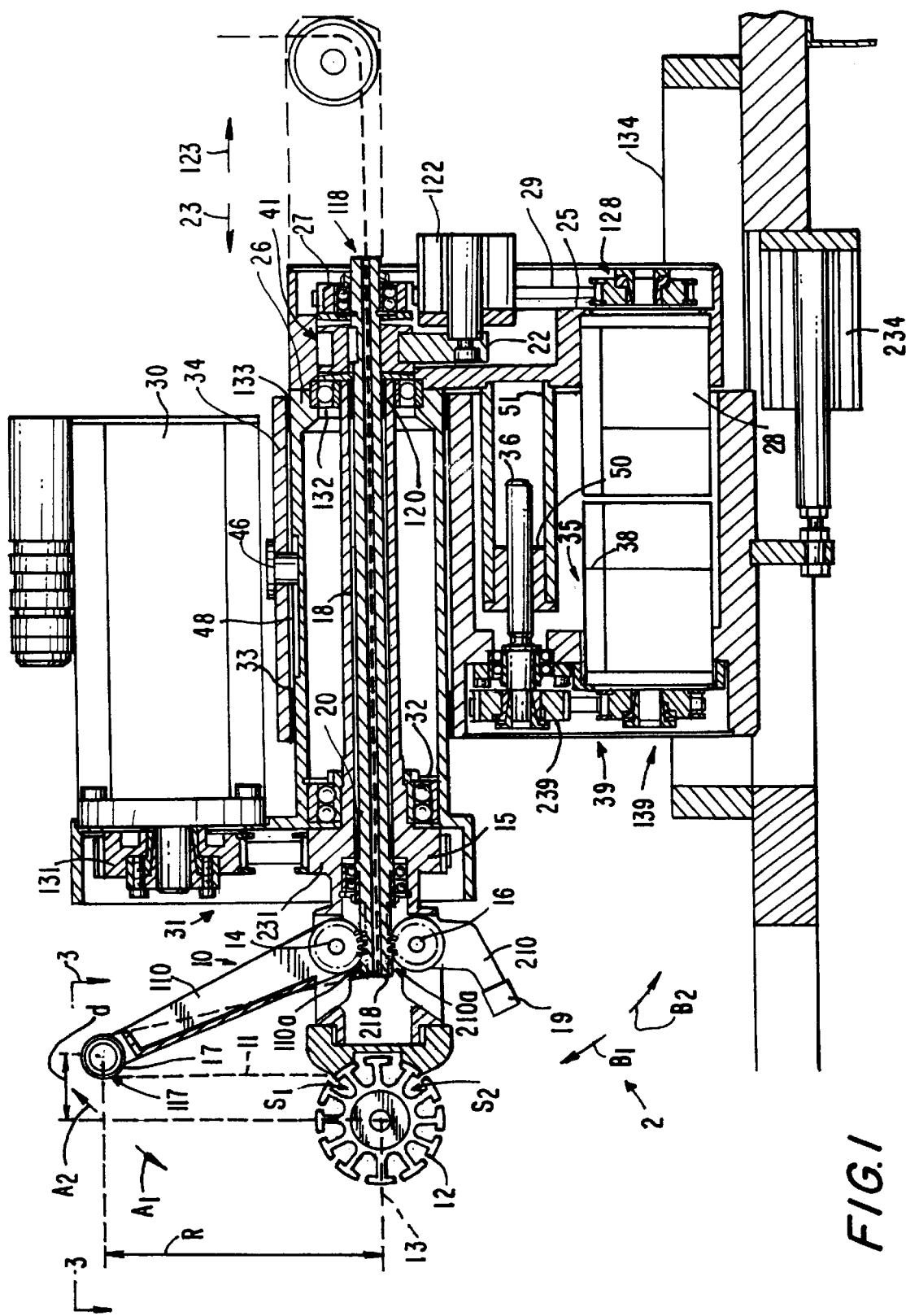
FIG. 1 is a sectional view of an armature winder according to the invention.

In conventional flyer-type armature winders, the wire delivery point of the flyer is adjustable only along a longitudinal axis of the armature winder to allow for the loading and unloading of armatures. If different size armatures are used, extensive and complex wire guide members are required to guide the wire from the wire delivery point to the slots in the armature into which the wire is wound. The invention improves upon a typical armature winder by providing a winding arm or flyer which has a wire delivery point with two degrees of freedom relative to the longitudinal axis of the winder. The wire delivery point can be moved along the longitudinal axis of the armature winder and radially outwards from the longitudinal axis of the winder by adjusting the adjustable flyer. A combination of the two motions may move the wire delivery point in any desired linear or arcuate motion, or other two-dimensional motion, with respect to the armature, thus obviating the need for complex wire guide members.

An advantage of accurately positioning the wire during winding is the reduction of the amount of surface of the wire guide members along-which the wire needs to travel. This may be accomplished because the winder arm according to the invention has greater adjustability than conventional winder arms, as mentioned above. This adjustability allows the angle relative to the longitudinal axis of the armature winder with which the wire is fed into the slots to be changed. Therefore, the wire can be directed more precisely into the slots without having to rest as much on the wire guide members. Furthermore, the wire requires less guidance when it is released from the wire delivery point at a reduced distance from the entrance of the slots. This also reduces the surface area of the wire guide member required to feed the wire into the slots and greatly simplifies the actual geometry of the wire guide members.

In one preferred embodiment, the two degrees of freedom are effectuated by providing a flyer that includes a winding arm which pivots about an axis perpendicular to the longitudinal axis of the armature winder. Pivotability of the winding arm, or any other improvement that allows the wire delivery point to be shifted along either of the two directions mentioned above provides flexibility in the size and shape of the armatures that may be used with a particular armature winder because the wire delivery point may be moved to suit an armature of a particular size.

The invention is particularly concerned with improving the quality of the coils of the armature. Because of the adjustability of the wire delivery point, a greater number of coil turns can be wound more deeply into the slots of the armature, the wire can be less subject to stress produced by the wire guide members (by reducing the travel path on the wire guide members), the overall tension of the wire forming the coil can be more constant, and the coils turns can be more regularly distributed in the slots. These improvements result from the better tension and direction control applied to the wire leaving the flyer, which is achieved, according to the invention, by reducing the radial distance from the wire delivery point to the armature, and by varying the angle with which the wire is fed into the slots.

The basic components that comprise an armature winder for winding a wire onto an armature according to the invention preferably are as follows: a flyer having an adjustable winding arm and, preferably, an adjustable counterweight arm, a command bar for controlling the position of the arms, a driving tube for rotating the flyer, a dual collar and clutch plate assembly for governing the interaction between the command bar and the driving tube during operation and adjustment of the flyer, suitable hardware for providing course and fine adjustments of the flyer along a longitudinal axis, and suitable motors for actuating certain components of the armature winder. These components are shown in the FIGURES as described below.

Armature winder 2 is shown in FIG. 1 in section along a plane transverse to its longitudinal axis 13. As shown in FIG. 1, the flyer 10 can rotate around longitudinal axis 13 of the armature winder 2 to deliver wire 11 into slots $S_1$ and $S_2$ of armature 12.

Flyer 10 preferably comprises winding arm 110 and counterweight arm 210. Winding arm 110 is hinged to one side of an enlarged end of driving tube 15, by means of pin 14. Counterweight arm 210 preferably is hinged to the same enlarged end, preferably by means of pin 16. Winding arm 110 preferably is provided with pulley wheel 17 for delivering the wire being wound. Counterweight arm 210 preferably is provided with enlarged portion 19, which preferably acts as a preponderant counterweight mass to oppose the centrifugal force generated by rotation of winding arm 110, thereby rotationally balancing the flyer 10.

Wire 11 preferably comes from a wire tensioner (not shown) like those described in copending commonly-assigned U.S. Pat. No. 5,826,774, which is hereby incorporated by reference in its entirety. The wire preferably enters through an opening in command bar 18 at end 118, travels through the entire interior of command bar 18 and exits from end 218. From here, the wire preferably extends to pulley wheel 17, where it preferably is delivered from wire delivery point 117 to armature 12 when there is rotation around axis 13. Command bar 18 preferably is supported on guide rings 20 and 120.

Driving tube 15, on which winding arm 110 and counterweight arm 210 preferably are hinged, preferably is supported on bearings 32 and 132. Bearings 32 and 132 preferably are seated in support tube 26. Support tube 26 preferably is supported on guide rings 33 and 133, preferably seated in frame housing 34. Guide rings 33 and 133 preferably allow support tube 26 to be translated in directions 23 or 123.

Figure 2:
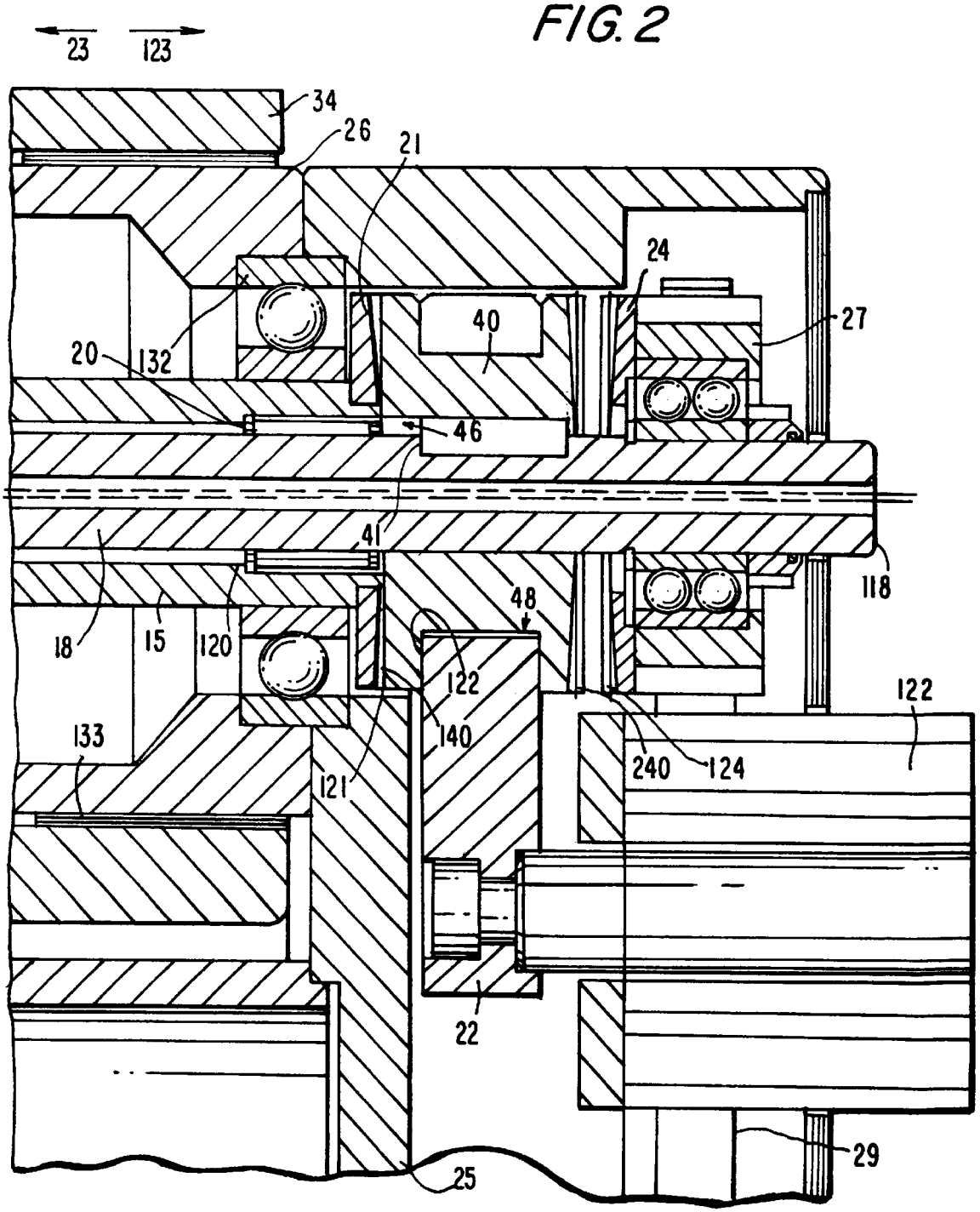
FIG. 2 is a blown-up sectional view of a portion of an armature winder according the invention.

A dual collar and clutch plate assembly preferably govern the interaction between command bar 18 and driving tube 15. As best seen in FIG. 2, collar 21 having toothed face 121 preferably is assembled close to end 118 of command bar 18. An opposite collar 24, having teeth 124, preferably is supported on bearings of an extension structure 25 of support tube 26. Motor 28 (shown in FIG. 1), which preferably is also supported by extension structure 25, preferably can rotate opposite collar 24 to adjust flyer 10 as will be explained below, preferably by means of belt transmission 29, preferably extending between pulley 27 and a pulley wheel 128 preferably mounted on the output axle of motor 28.

A two-sided clutch plate 40 (shown in FIG. 2) is preferably positioned between collar 21 and collar 24. Clutch plate 40 can preferably slide axially along command bar 18 between collars 21 and 24. When the winder is winding wire into the armature, clutch plate 40 preferably engages collar 21. When the flyer is being adjusted, clutch plate 40 preferably engages opposite collar 24. A clutch plate key 41 on command bar 18 preferably cooperates with a clutch plate slot 46 on clutch plate 40 to prevent rotation of clutch plate 40 around command bar 18. Clutch actuator bar 22 preferably engages recess 48 in clutch plate 40.

Bar 22 preferably can be moved either in direction 23 or in direction 123 along the length of command bar 18, preferably by means of pneumatic cylinder 122, which preferably causes either teeth 140 on clutch plate 40 to interlock with teeth 121 on clutch plate 21, or teeth 240 to interlock with teeth 124 on opposite collar 24.

During winding of the armature, teeth 140 preferably are caused to interlock with teeth 121 which rotationally locks command bar 18 to driving tube 15. This engagement preferably is achieved when clutch plate 40 is moved by displacing bar 22 in direction 23.

To adjust winding arm 110, clutch bar 22 preferably is moved in direction 123. This causes teeth 240 to interlock with teeth 124 on opposite collar 24. Command bar 18 may thereby be rotated by rotation of opposite collar 24. After teeth 240 on clutch plate 40 have engaged teeth 124 on collar 24, and pulley wheel 128 on motor 28 is rotated, command bar 18 preferably rotates on guide rings 20 and 120. At the same time, motor 30, preferably connected to driving tube 15 by belt transmission 31, preferably is actuated in torque to prevent rotation of driving tube 15. The lower end 110a of winding arm 110 preferably is toothed and preferably engages a toothed sector of command bar 18. Similarly, the upper end 210a of counterweight arm preferably is toothed and engages another toothed sector of command bar 18. Because of this engagement between flyer 10 and command bar 18, rotation of command bar 18 while driving tube 15 is locked, causes winding arm 110 to move in either of angular directions $A_1$ or $A_2$, around pin 14, depending on which of two rotation directions are being used on motor 28. At the same time that winding arm 110 is rotating, counterweight arm 210 also rotates, in either of angular directions $B_1$ or $B_2$, around pin 16.

The inclination of the teeth in 110a and 210a preferably are such that, when winding arm 110 rotates in direction $A_1$, counterweight arm rotates in direction $B_1$, and when winding arm 110 rotates in direction $A_2$, counterweight arm rotates in direction $B_2$. Thus, the two arms preferably will either move towards each other, or spread apart, depending on which rotational direction is chosen for motor 28. The simultaneous displacement of counterweight arm 210 in direction $B_1$, or in direction $B_2$, counteracts the different centrifugal forces that result from the displacement of winding arm 110.

When winding arm 110 is moved in direction $A_2$, distance d, measured between pulley wheel 17 and axis 13 of armature winder 2, increases. At the same time, distance R, measured between pulley wheel 17 and axis 13 of armature winder 2, also increases.

When winding arm 110 is moved in direction $A_1$, both distance d and distance R decrease. Thus, the invention provides the wire delivery point of the armature with the adaptability of two degrees of freedom: one, d, along axis 13 and one, R, along a path transverse to axis 13.

After the desired adjustment of winding arm 110, clutch bar 22 may preferably be moved in direction 23 to lock command bar 18 to driving tube 15, so that the adjustment of winding arm 110 does not change during winding. The size and pitch of teeth 121 and 140 are preferably made small enough that the engagement of clutch bar 22 and collar 21 does not disturb the adjustment of winding arm 110 by any significant amount.

The armature winder preferably operates to wind an armature as follows. By rotating motor 30, flyer 10 can be rotated around axis 13, to wind the armature with wire 11. More particularly, rotation of motor 30 preferably is transmitted to driving tube 15 preferably by means of a belt transmission 31. Belt transmission 31 preferably extends between pulley wheel 131, fixed to the output axle of motor 30, and pulley wheel 231, fixed to driving tube 15.

Actuation of drive unit 35 preferably accomplishes fine adjustments to distance d, as required for different armature sizes. By moving support tube 26 in direction 23, distance d can be reduced. By moving support tube 26 in direction 123, distance d can be increased.

Drive unit 35 preferably comprises a screw bar 36, preferably mounted on bearing 37 of frame housing 34. Screw bar 36 preferably meshes with sleeve 50, which preferably is part of extension cylinder 51. Extension cylinder 51 preferably is carried by extension structure 25 of support tube 26. By rotating screw bar 36, support tube 26 can be moved, in either direction 23 or direction 123.

Rotation of screw bar 36 preferably can be obtained by rotating motor 38. Motor 38 preferably is flanged to frame housing 34 and imparts rotation to screw bar 36 by means of belt transmission 39. Belt transmission 39 preferably extends between pulley wheels 139 and 239, respectively coupled to the output axle of motor 38, and to the end of screw bar 36. Key 46, shown in FIG. 1, preferably rotationally locks support tube 26 to frame housing 34, but permits support tube 26 to move axially, within the limits of slot 48, in response to axial force provided by rotation of screw bar 36.

Frame housing 34 preferably can be moved on guide 134 by pneumatic cylinder 234, in either direction 23 or 123 to accomplish coarse adjustments to distance d, in order to bring the flyer forward for winding, or to retract the flyer when armatures need to be loaded and unloaded in the winder, respectively.

FIG. 3 is a view from line 3—3 of FIG. 1, with the flyer that has been rotated around axis 13 to various positions, at 90° with respect to the position which the flyer occupies in FIG. 1.

In FIG. 3, position $P_1$, at distances $d_1$ and $R_1$, is a typical position used in the prior art, with the wire being wound 11a which is extended and deflected by guide surface 42 in order to be maintained in alignment with slots $S_1$, and $S_2$.

Position $P_2$, at shorter distances $d_2$ and $R_2$, is one position used for winding according to the invention, with the winding arm adjusted to obviate the need for complex wire guide members. In position $P_2$, the flyer has been brought closer to the slots being wound. No wire guide member is shown in position $P_2$ to illustrate that the wire can be positioned as to enter directly into slots $S_1$, and $S_2$, though a wire guide surface is recommended.

Wire 11b, being wound with the use of position $P_2$, is shorter in the extension between the armature and the flyer. The angle of entry of wire 11b into slots $S_1$, and $S_2$ is also more perfectly aligned with the trajectory that the coil turns require.

These positions reduce the required size and complexity of the wire guide members. They also produce a better control of the tension and the position of the wire as it is being wound. This achieves a more regular distribution of the coil turns, within the wound coil, and more constant tension of the wire forming the coil turns. Dense winding of turns, deeply into the slots, is also a positive effect achieved by these positions.

FIG. 4, which is a view from direction 4—4 of FIG. 3, shows coil C of wire 11b being wound in slots $S_1$, and $S_2$ by the flyer positioned in position $P_2$. Position $P_2$ illustrates the reduced distance between the wire delivery point and the slots as well as the increased angle with which the wire can be delivered into the armature. Thus, if guide surfaces 43 are needed, this would be only for assisting in maintaining the wire in alignment with the entrance E of the slots. Therefore, guide surfaces 43 would have an extremely reduced surface extension, and consequently produce much less stress on wire 11b, because wire 11b leaving the flyer is already well aligned with slots $S_1$, and $S_2$. The configuration of guide surfaces 43 is also simplified, because now their main purpose would be only to act as an abutment edge to maintain the wire aligned with the slots entrances E. Though inclination of the wire guide members towards the armature is still recommended for conveying the wire correctly, running of the wire on guide surfaces 43 is preferably reduced to a minimum.

FIG. 3 also shows that the flyer can preferably be positioned in position $P_3$, at even shorter distances $d_3$ and $R_3$. In this position, pulley wheel 17 is shown adjacent commutator 60. This position is particularly useful for termination operations which need to be accomplished between winding of coils.

Termination operations achieve connection of the coil leads to the tangs 62 (most of which are omitted for clarity) of commutator 60, by rotations of the flyer and the armature. By using position $P_3$ for termination, the wire can be accurately directed around the tang, during rotation of the flyer around axis 13. The accuracy can be optimized by position $P_3$, or a similar position, such that traditional hooking plates, as shown in commonly-assigned U.S. Pat. No. 5,493,770, which is hereby incorporated by reference in its entirety, are no longer required in a winder operating according to these principles.

In addition, if the flyer is pivoted in conjunction with movement along axis 13, a movement only along R can be obtained.

Thus, the winder of this invention can be converted to winding different armature sizes (winding of armatures having the coil slots in different positions), by modifying the position of the flyer (distances d and R), as has been described in the foregoing.

Furthermore, between winding of the coils of the same armature, the flyer position can be modified to accurately terminate the coil leads for the commutator size that requires termination.

Figure 5:
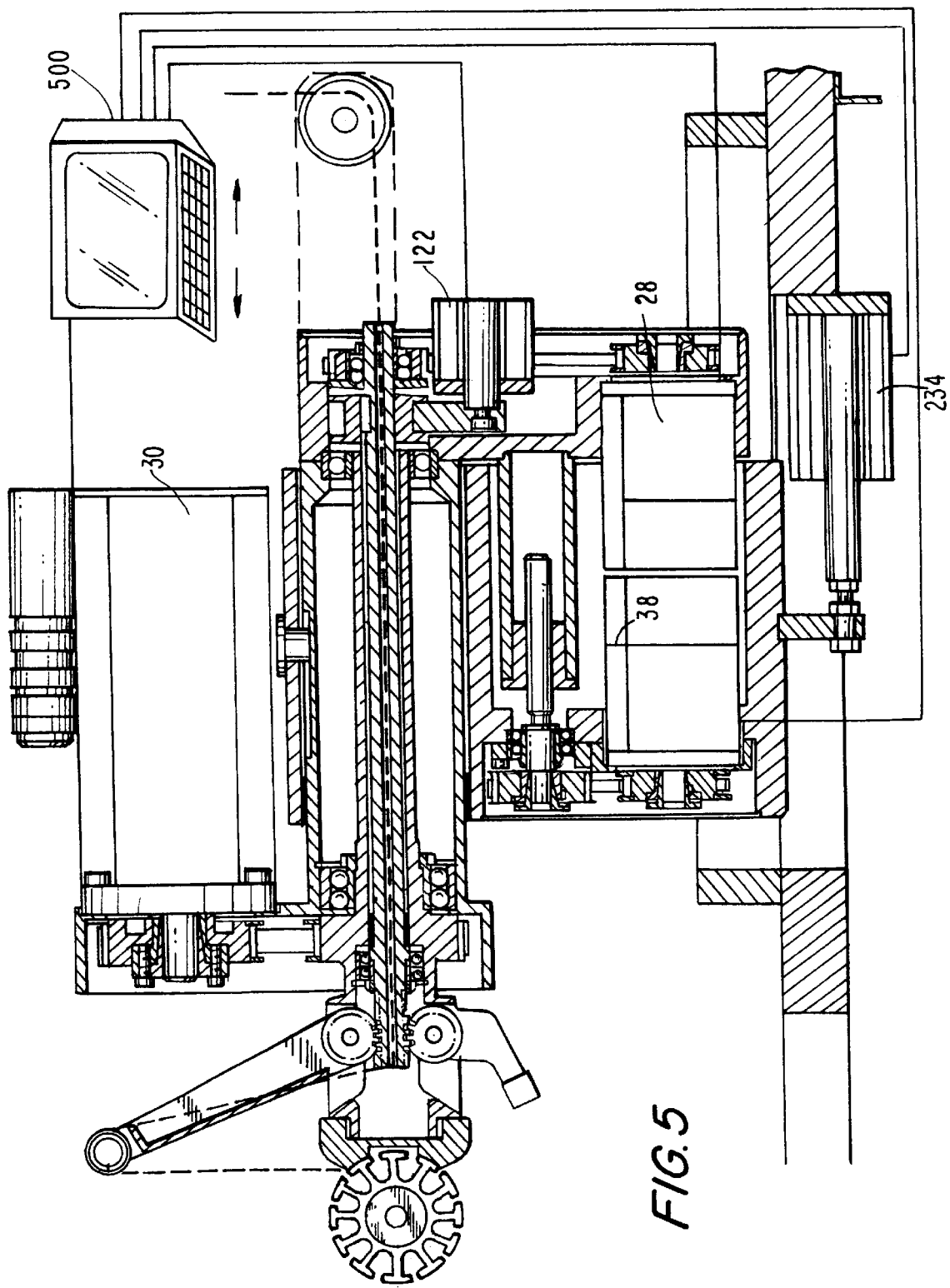
FIG. 5 is a sectional view of an armature winder according to the invention.

Each of motors 28, 30, 38 and pneumatic cylinders 122 and 234 may be computer-controlled so that changes to distances d and R can be programmable, memorized and achieved with great accuracy. FIG. 5 shows a substantially conventional personal computer 500 coupled in a substantially conventional way as known to one of ordinary skill in the art, to motors 28, 30, 38 and pneumatic cylinders 122 and 234. In one embodiment shown in FIG. 5, computer 500 may preferably be programmed for different size armatures. The programmable armature winder settings for each different size armature may be implemented by actuating the motors.

Thus it is seen that an armature winder having a pivotable flyer which reduces the area of contact between the wire and the wire guide members, provides uniform tension to the wire, provides improved direction control and is capable of providing all the foregoing advantages for armatures of various sizes and shapes has been provided. One skilled in the art will appreciate that the present invention can be practiced by other than the described embodiments, which are presented for purposes of illustration rather than of limitation, and the present invention is limited only by the claims which follow.

What is claimed is:

1. A winder for rotatably winding a wire onto an armature, said winder having a longitudinal axis, said winder comprising:
   an adjustable winding arm attached to said winder, said winding arm for winding said wire from a wire delivery point located on said winding arm, said winding arm being adjustable such that said wire delivery point may be moved along a path having a component of motion transverse to said longitudinal axis, said winding arm being pivotably attached to said winder, said winding arm pivoting around an axis transverse to said longitudinal axis; and
   a driving tube for adjusting the position of said winding arm, wherein said driving tube is coaxial with said winder, said driving tube is movably connected to said winding arm.

2. The winder of claim 1, wherein said winding arm is adjustable such that said wire delivery point may be moved also along a component of motion parallel to said longitudinal axis.

3. The winder of claim 1 further comprising a command tube coupled to said driving tube and to said winding arm, whereby relative movement between said driving tube and said command tube adjusts the position of said wire delivery point.

4. The winder of claim 3 wherein relative rotational movement between said command tube and said driving tube causes the winding arm to pivot about an axis substantially perpendicular to said longitudinal axis.

5. The winder of claim 3 wherein said driving tube is constrained to move with said command tube when said winding arm winds said wire onto said armature.

6. The winder of claim 3 further comprising a clutch plate for allowing said driving tube and said command tube to move relative to one another when said winding arm is being adjusted, and for constraining said driving tube to move with said command tube when said winding arm is winding wire onto said armature.

7. The winder of claim 3 further comprising a motor mechanically attached to said driving tube, said motor for actuating relative rotational movement between said driving tube and said command tube, said rotational movement for adjusting said winding arm.

8. The winder of claim 1 further comprising an adjustable counterweight arm attached to said winder opposite to said winding arm with respect to said longitudinal axis, said counterweight arm for balancing a centrifugal force generated by a rotation of said winding arm.

9. The winder of claim 1 further comprising a programmable control for adjusting said winding arm.

10. The winder of claim 1, said armature further comprising a plurality of tangs, wherein said winding arm is adjustable to reduce the distance between said wire delivery point and said tangs in order to wrap said wire around at least one of said tangs.

11. A method of winding an armature with wire using a winder having a longitudinal axis and an adjustable winding arm, said winding arm comprising a pivoting point and a wire delivery point, said pivoting point being located proximal to said longitudinal axis, said wire delivery point being located distal from said longitudinal axis, said method comprising:
   loading said armature into a loading position on said winder;
   rotating said winding arm in its entirety about said pivoting point, in order to reduce radial distance from said armature to said wire delivery point while still being able to wind wire onto said armature;
   winding said wire onto said armature; and
   removing said armature.

12. The method of claim 11 further comprising adjusting said wire delivery point in a path including a component of motion parallel to said longitudinal axis.

13. A method of winding a plurality of armatures with wire, said plurality of armatures being of varying sizes, using a winder having a longitudinal axis and an adjustable winding arm, said winding arm comprising a pivoting point and a wire delivery point, said pivoting point being located proximal to said longitudinal axis, said wire delivery point being located distal from said longitudinal axis, said method comprising:
   loading a first armature into a loading position on said winder;
   rotating said winding arm in its entirety about said pivoting point, in order to reduce radial distance from said armature to said wire delivery point while still being able to wind wire onto said armature;
   winding said wire onto said armature;
   removing said armature;
   replacing said first armature with a second armature having a different size from the first armature; and
   repeating said rotating, said winding, and said removing.

14. The method of claim 13 further comprising adjusting said wire delivery point in a path including a component of motion parallel to said longitudinal axis.

15. The method of claim 14, wherein said rotating of said winding arm is mechanically actuated through a motor.

16. The method of claim 15, wherein said motor is activated through a programmable control.

17. A method of winding an armature with wire using a winder having a longitudinal axis and an adjustable winding arm, said winding arm comprising a pivoting point and a wire delivery point, said pivoting point being located proximal to said longitudinal axis, said wire delivery point being located distal from said longitudinal axis, said method comprising:

rotating said winding arm in its entirety about said pivoting point, in order to reduce the distance between said wire delivery point and a plurality of tangs in said armature; and wrapping said wire around at least one of said tangs.

18. The method of claim 17, wherein said armature comprises coils including coil leads, said method further comprising adjusting said winding arm in order to connect said coil leads to said tangs between winding of said coils.

19. A winder for rotatably winding a wire onto an armature, said winder having a longitudinal axis and an adjustable winding arm, said winding arm comprising:

a pivoting point located proximal to a first end of said winding arm, said first end being proximal to said longitudinal axis, said winding arm being pivotably attached to said winder at said first end, said winding arm which may be pivoted about said pivoting point; and a wire delivery point for winding said wire onto said armature, said wire delivery point being located proximal to a second end of said winding arm.

20. The winder of claim 19 further comprising a driving tube for adjusting the position of said winding arm, wherein said driving tube is coaxial with said winder, said driving tube being movably connected to said winding arm.

21. The winder of claim 20 further comprising a command tube coupled to said driving tube and to said winding arm, whereby relative movement between said driving tube and said command tube adjusts the position of said wire delivery point.

22. The winder of claim 21 wherein relative rotational movement between said command tube and said driving tube causes the winding arm to pivot about an axis substantially perpendicular to said longitudinal axis.

23. The winder of claim 21 wherein said driving tube is constrained to move with said command tube when said winding arm winds said wire onto said armature.

24. The winder of claim 21 further comprising a clutch plate for allowing said driving tube and said command tube to move relative to one another when said winding arm is being adjusted, and for constraining said driving tube to move with said command tube when said winding arm is winding wire onto said armature.

25. The winder of claim 21 further comprising a motor mechanically attached to said driving tube, said motor for actuating relative rotational movement between said driving tube and said command tube, said rotational movement for adjusting said winding arm.

26. The winder of claim 19 further comprising an adjustable counterweight arm attached to said winder opposite to said winding arm with respect to said longitudinal axis, said counterweight arm for balancing a centrifugal force generated by a rotation of said winding arm.

27. The winder of claim 19 further comprising a programmable control for adjusting said winding arm.

28. The winder of claim 19, said armature further comprising a plurality of tangs, wherein said winding arm is adjustable to reduce the distance between said wire delivery point and said tangs in order to wrap said wire around at least one of said tangs.

* * * * *